US006880076B2

(12) United States Patent
Greiner et al.

(10) Patent No.: US 6,880,076 B2
(45) Date of Patent: Apr. 12, 2005

(54) SYSTEM AND METHOD FOR COMMUNICATING DEVICE INFORMATION BETWEEN A DEVICE AND A CONTROLLER

(75) Inventors: Robert J. Greiner, Beaverton, OR (US); Matthew Ma, Portland, OR (US); Edward P. Osburn, Folsom, CA (US); Michael Stapleton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 538 days.

(21) Appl. No.: 09/895,062

(22) Filed: Jun. 29, 2001

(65) Prior Publication Data

US 2003/0005343 A1 Jan. 2, 2003

(51) Int. Cl.[7] .............................................. G06F 15/177
(52) U.S. Cl. .............................. 713/1; 713/1; 713/100; 713/300; 713/400; 713/500; 713/600; 709/221; 709/222; 709/232; 709/400
(58) Field of Search .......................... 713/1, 300, 100, 713/400, 500, 600; 709/221, 222, 232, 400

(56) References Cited

U.S. PATENT DOCUMENTS

| | | | | |
|---|---|---|---|---|
| 4,737,657 A | * | 4/1988 | Jatko et al. ................... 307/85 |
| 5,664,123 A | * | 9/1997 | Lee et al. ..................... 710/62 |
| 5,748,684 A | * | 5/1998 | Sanchez ....................... 375/357 |
| 5,764,529 A | * | 6/1998 | Capps et al. .................. 716/1 |
| 5,918,023 A | * | 6/1999 | Reeves et al. ................ 710/301 |
| 6,094,367 A | * | 7/2000 | Hsu et al. ..................... 363/78 |
| 6,226,741 B1 | * | 5/2001 | Shen et al. ................... 713/100 |
| 6,412,023 B1 | * | 6/2002 | Hirabayashi et al. .......... 710/5 |
| 6,560,240 B1 | * | 5/2003 | Borland et al. ............... 370/444 |
| 6,615,360 B1 | * | 9/2003 | Amini et al. ................. 713/330 |
| 6,724,772 B1 | * | 4/2004 | Borland et al. ............... 370/442 |
| 6,732,266 B1 | * | 5/2004 | Anderson et al. ............ 713/100 |
| 2002/0120882 A1 | * | 8/2002 | Sarangi et al. ............... 713/600 |

\* cited by examiner

*Primary Examiner*—Lynne H. Browne
*Assistant Examiner*—Nitin C. Patel
(74) *Attorney, Agent, or Firm*—Kenyon & Kenyon

(57) ABSTRACT

Embodiments of the present invention describe a system and method for microprocessor power regulation. An appropriate amount of voltage is provided to a microprocessor based on a voltage identifier (VID) received by a voltage controller from the microprocessor via a serial communication line. A voltage identifier clock signal (VIDClock) is used for the timing of transmission and receipt of data/acknowledgement signals. A guard clock signal (VIDGuard) is provided via a separate guard clock line to prevent potential noise on the clock line from causing a clock signal misidentification, which could cause a wrong value to be received as the VID. VIDGuard is analyzed in relation to ViDClock to verify the value of the clock signal. To verify receipt of the VID data, a voltage identifier acknowledgement line (VIDAck) is transmitted from the voltage regulator to the microprocessor. The acknowledgement signal is checked by a two-part receipt verification, high-to-low and low-to-high.

30 Claims, 12 Drawing Sheets

SYSTEM AND METHOD FOR COMMUNICATING DEVICE INFORMATION BETWEEN A DEVICE AND A CONTROLLER

BACKGROUND INFORMATION

The present invention relates to microprocessor (chip) power regulation. More specifically, the present invention relates to a system and method for providing an appropriate amount of voltage to a microprocessor based on information received by a voltage controller from said microprocessor.

Typical personal computers utilize a power supply to distribute a base potential of, for example, five volts (direct current, DC) to the various components of the system. In a continuing effort to minimize power consumption as well as heat production, developers strive to minimize chip voltage requirements. In order to convert the initial five-volt supply to an appropriate value for the chip, voltage regulation of some kind is required.

A typical chip requirement has been 3.5 volts. In order to supply the correct amount of voltage to the chip, the manufacturer (or whomever may be the installer), reads a label on the chip providing voltage identification (VID) and, depending on the method available, 'straps' (by clip, solder bridge, etc.) the chip's pins in a manner to provide the necessary potential. As an alternative, the hardware manufacturer or configurer might avoid using straps ('jumpers') by utilizing a series of 'fuses'. The manufacturer would burn a specific combination of fuses to encode the appropriate VID, describing the voltage requirements of the chip.

FIG. 1 provides an illustration of the parallel interface between a microprocessor 102 and a voltage regulator 104 via a communication line 106 in the art. Upon system configuration, the voltage regulator (VR) 104 interprets an encoded VID, which has been communicated from the microprocessor 102, and directs the appropriate amount of voltage to the microprocessor 102. With the five bits of resolution provided by this parallel interface, no more than thirty-two different voltage requirements can be identified.

With several parameters, such as minimization of heat and power consumption as well as performance optimization, affecting voltage requirements of today's chips, the variance in required voltage amongst chips and the precision with which the voltage is to be met is continually increasing. This, combined with the fact that typical voltage requirements of chips is steadily decreasing with the reduction of chip size, causes there to be difficulty choosing the appropriate voltages to be represented by the 32-value range such that the range has both sufficient variance and sufficiently fine granularity.

There are different systems in the art for transmitting information between devices for use in device configuration and management. For example, the System Management (SM) Bus (Version 2.0; SBS Implementors Forum; Aug. 3, 2000), a derivative of the Inter-Integrated Circuit (I²C) by Phillips Semiconductor™, was developed to provide a communication link between an 'intelligent' battery, a charger for the battery, and a microcontroller that communicates with the rest of the system. FIG. 2 illustrates the operational layout of a generic SM Bus. Device 1 202 passes data, such as system management information, via a communication line 204 to Device 2 206. To regulate the timing of transmission and reception of the data, a clock signal is utilized and is transmitted via a clock signal line 208. Although this system provides for transmission of management information, it has many critical deficiencies, as explained below, limiting its ability to regulate a microprocessor's voltage.

There is a need to improve current systems of microprocessor voltage regulation such that voltage range granularity and variance are increased and quantity of necessary pin connections is reduced, as well as several other desired improvements.

DETAILED DESCRIPTION

Figure 1:
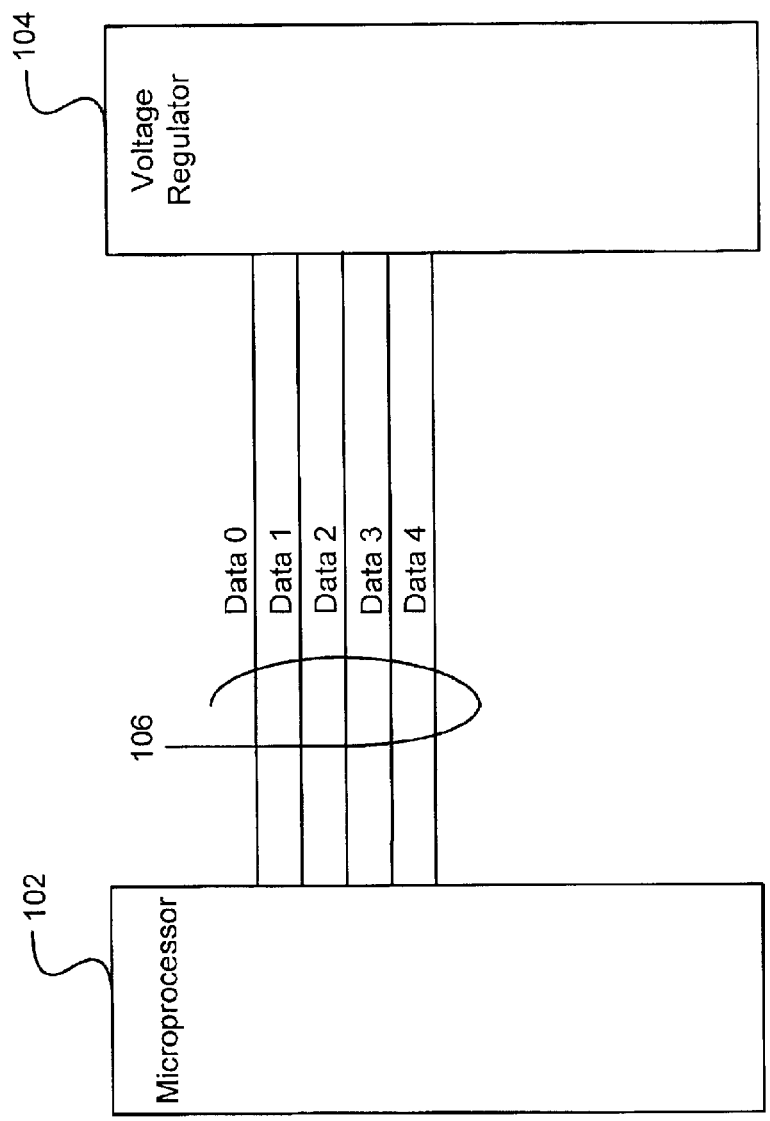
FIG. 1 provides an illustration of the parallel interface between a microprocessor and a voltage regulator via a communication line 106 in the art.
Figure 2:
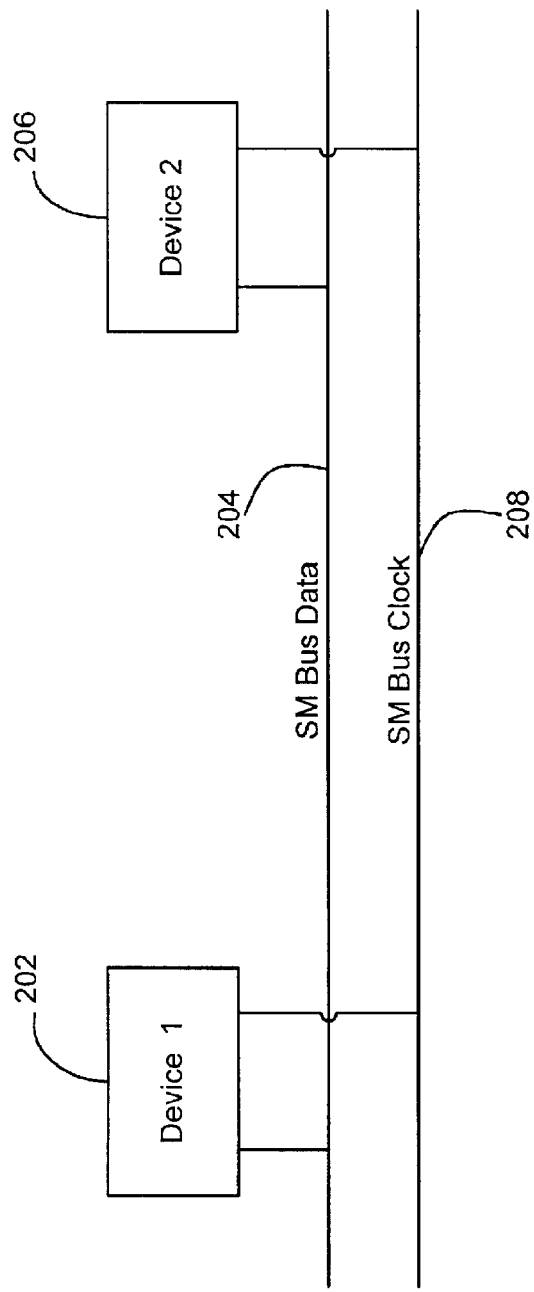
FIG. 2 illustrates the operational layout of a generic SM Bus in the art.
Figure 3:
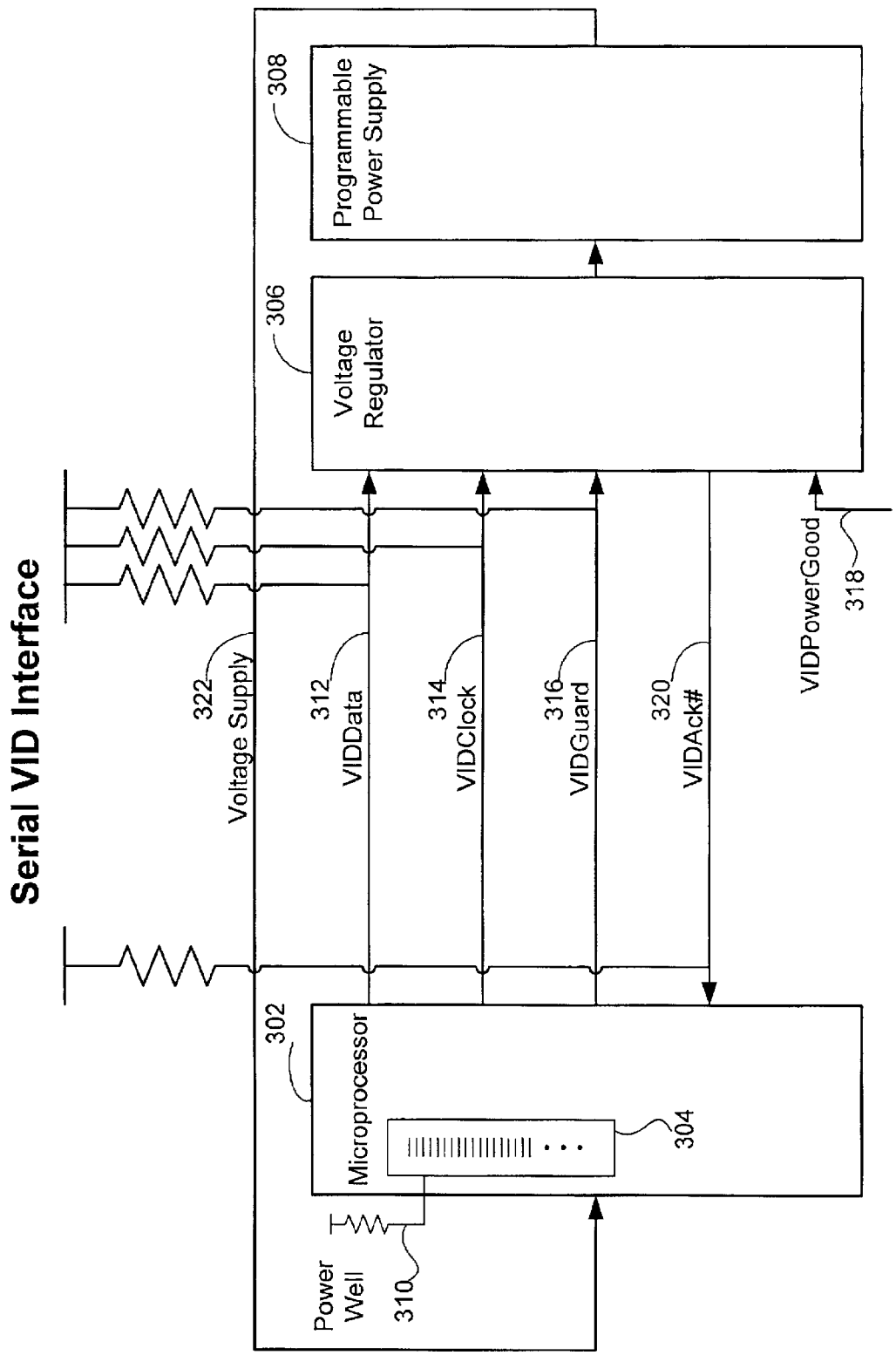
FIG. 3 provides a diagram illustrative of a serial VID interface under principles of the present invention.

FIG. 3 provides a diagram illustrative of a serial VID interface under principles of the present invention. In one embodiment, having initial configuration coding for the microprocessor (chip) 302 incorporated into the combination of (pulsed and unpulsed) chip fuses 304, the voltage identifier (VID) is extracted for communication to a voltage regulator (VR) 306. Upon system power-up, voltage levels are unstable and/or erratic. In one embodiment, the VR 306 and the chip 302 have defined roles in sequencing the power supply 308. First, the VR 306 brings up an auxiliary power supply to power the chip's 302 power well 310. When the chip 302 has detected a valid power level at the power well 310, the chip 302 reads the intended VID from the chip fuses 304 and communicates the VID to the VR 306. At this point, in one embodiment, the VR 306 has started an RC timer (VIDPowerGood 318). When VIDPowerGood 318 tells the VR 306 that enough time has elapsed (and therefore, that the auxiliary power supply is valid), the VR 306 starts to listen for VID communicated by the chip 302. When the VR 306 receives a valid VID command sequence, the VR 306 commands the power supply 308 to turn on and establish the commanded voltage level.

In one embodiment of the present invention, the VID is transmitted serially via a communication line 312 to the VR 306. Upon start-up, the system clock is not yet stable. Therefore, in one embodiment, the chip 302 produces and communicates its own VID clock signal via a line 314 between the chip 302 and the VR 306. This clock signal is used for the timing of transmission and receipt of data/acknowledgement signals. Because only one common clock is utilized, there is no need for clock speed matching through Phase-Locked Loop (PLL) methods or the like.

Supplying the proper voltage to the chip 302 is very important. If the voltage is too low, the chip 302 may cease to operate. If the voltage is too high, the chip may be irreparably damaged. Therefore, making sure the proper VID (representative of the appropriate voltage) is communicated and received by the VR 306 is critical. One aspect of assuring the accuracy of data transmission is clock verification. To protect against errors caused by noise on the clock signal line 314, in one embodiment, a guard clock signal is provided via a separate, guard clock line 316. As explained below, the guard signal is analyzed in relation to the clock signal to verify the value of the clock signal.

Further, in one embodiment, to verify receipt of the VID data, a VID acknowledgement signal is transmitted from the VR 306 to the chip 302 via an acknowledgement line 320. As explained below, in one embodiment, the acknowledgement signal is checked by a two-part receipt verification, high-to-low and low-to-high.

In one embodiment, upon receipt of the serial VID data, the VR 306 decodes the information and directs a programmable power supply 308 to provide the chip 302 with the correct amount of voltage via a voltage supply line 322. In one embodiment, the process of checking and adjusting the chip 302 voltage can be reconfigured at various times to accommodate various changing parameters of the chip 302 or power supply 308, such as whether the power supply is drawing power from an external source or from a battery or whether the temperature of the chip 302 or power supply 308 is above its threshold.

Figure 4:
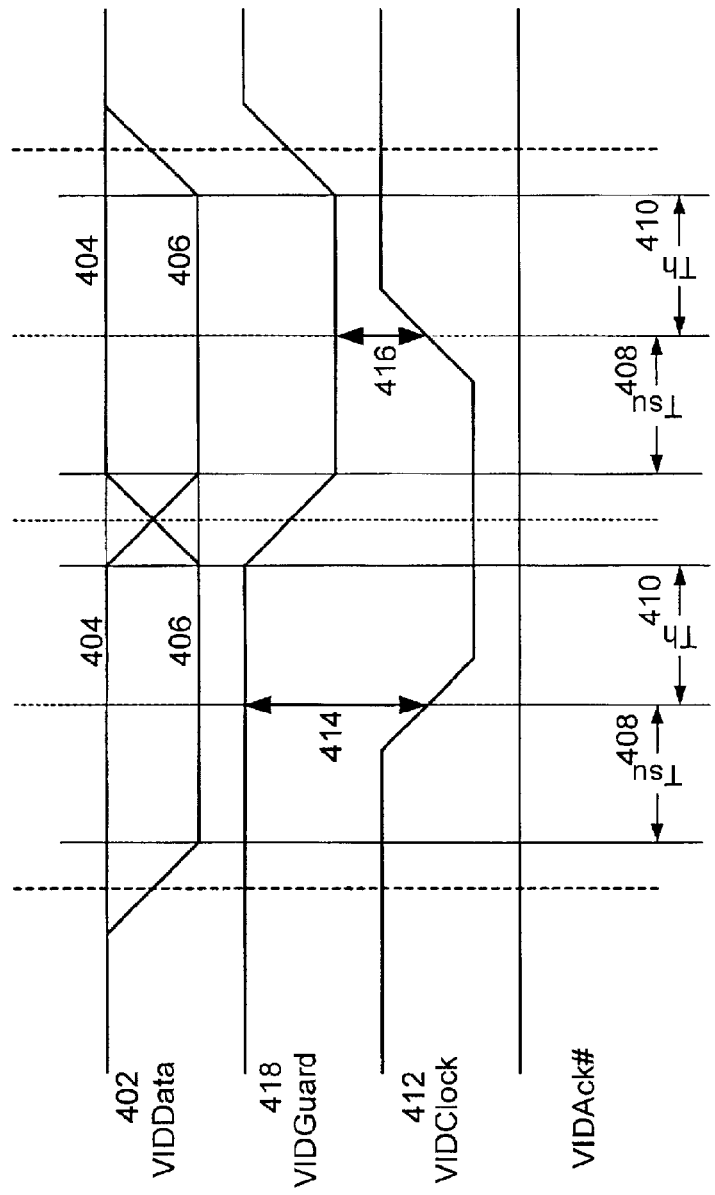
FIG. 4 provides a communication timing chart of signal lines between the microprocessor and voltage regulator with regard to the clock signal and guard signal operation under principles of the present invention.

FIG. 4 provides a communication timing chart of signal lines between the microprocessor and voltage regulator with regard to the clock signal and guard signal operation under principles of the present invention. In one embodiment, at any given time during transmission of the VID Data 402, the signal may be at either a binary '1' 404 or binary '0' 406. In order to be reliably sampled, VIDData must not change during the period of 'set-up' time (Tsu) 408 and 'hold' time Th 410. In order to verify the accuracy of clock reception, when the VR 306 (see FIG. 3) in one embodiment perceives a transition of the clock signal 412 between binary values, the guard signal 418 is sampled. In one embodiment, to verify accuracy of clock signal 412 perception, when the clock signal 412 is perceived to transition from high ('1') to low ('0'), the guard signal 418 is sampled 414. During the high-to-low clock transition, the guard signal must be high ('1') for clock verification. In one embodiment, when the clock signal 412 is perceived to transition from low ('0') to high ('1'), the guard signal 418 is sampled 416. During the low-to-high clock transition, the guard signal must be low ('0') for clock verification. Further, the sequence of these clocking signals must be verified as appropriate, e.g., a VIDClock 412 low-to-high transition with VIDGuard 418 sampled low must be ignored unless the previous VIDClock 412 high-to-low transition sampled VIDGuard 418 high.

This clock verification process is utilized to prevent potential noise on the clock line 314 (see FIG. 3) from causing a clock signal 412 misidentification, which could cause a wrong value to be received as the VID—a dangerous situation. As stated above, if too much voltage is supplied to the chip, damage may result. If too little voltage is supplied, the chip may stop operating.

Figure 5:
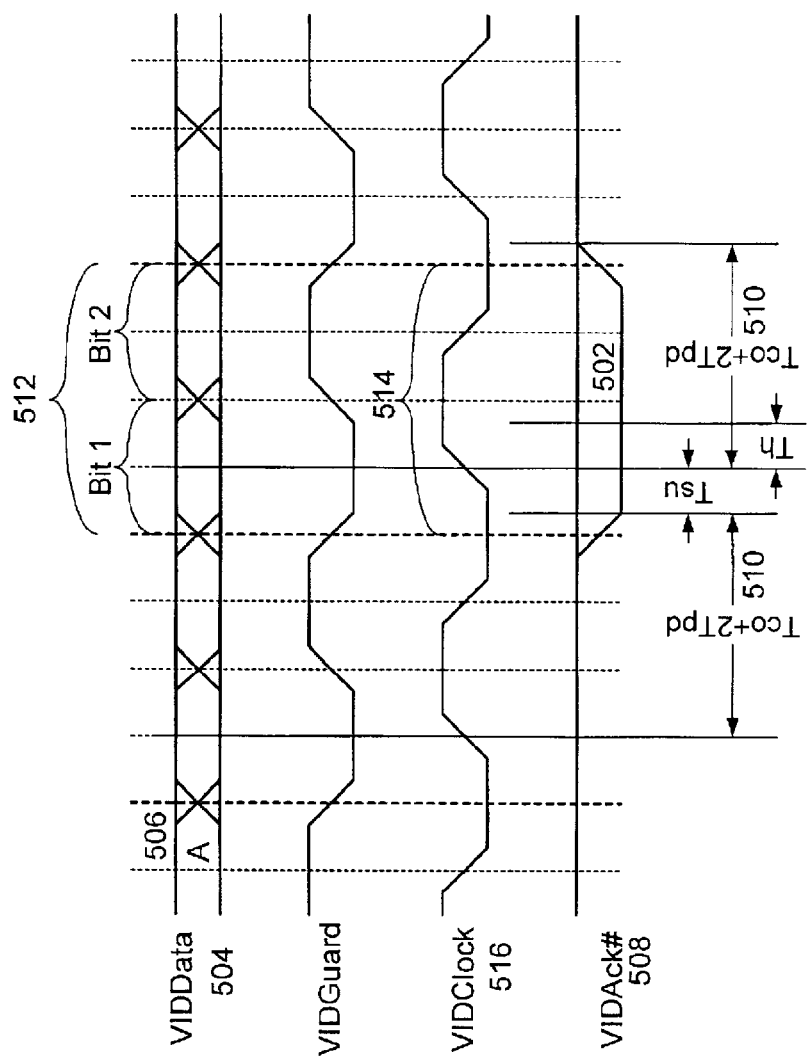
FIG. 5 provides a timing chart illustrative of signal line activity with regard to acknowledgement timing under principles of the present invention.

FIG. 5 provides a timing chart illustrative of signal line activity with regard to acknowledgement timing under principles of the present invention. In one embodiment, after the reception by the VR 306 (see FIG. 3) of a complete data packet via the data line 312 (FIG. 3), an acknowledgement statement 502 is returned by the VR 306 (FIG. 3), verifying receipt by the VR 306 (FIG. 3) to the chip 302 (FIG. 3). In one embodiment, some sequence of bits, ending at point A 506, at the end of a data packet will serve as a request for an acknowledgement.

The pattern ending at A 506, which triggers the acknowledgement, is clocked into the VR 306 one cycle before the acknowledgement is clocked out. (See FIG. 3) During that cycle, in one embodiment, the logic in the VR 306 evaluates whether acknowledgement is needed or not. (See FIG. 3) In one embodiment, when each guarded rising edge of VIDClock 516 occurs, the evaluated acknowledgement signal is waiting at the input of a storage element, such as the D input of a flip flop (not shown). The guarded VIDClock 516 rising edge propagates 502 the evaluated acknowledgement signal to the VIDAck# 508 pin with a clock to output delay.

In one embodiment, viewed from the perspective of the chip 302 (see FIG. 3), after bit A 506 is sent out, it takes an amount of time equal to the propagation delay ($T_{pd}$) times two, plus the time from clock output ($T_{co}$). This is provided in the figure as '$T_{co}+2T_{pd}$' 510. Travel time ($T_{pd}$) must pass before the data is received by the VR 306 (see FIG. 3). Then, the VR 306 (see FIG. 3) must wait for the next clock trigger ($T_{co}$), which is the transition of the clock signal 516 from low to high, before sending the acknowledgement 502. The chip 302 (see FIG. 3) won't receive the acknowledgement 502 until after another amount of travel time ($T_{pd}$) has passed. Therefore, it takes '$T_{co}+2T_{pd}$' for the return of the acknowledgement.

In one embodiment of the present invention, for reliability (verification) purposes, the chip 302 (see FIG. 3) will not recognize an acknowledgement 502 until it senses on the acknowledgement signal line 320 (see FIG. 3) a transition from high to low, followed by a transition from low to high. Only after sensing both transitions in the proper order and with appropriate timing will the chip 302 (see FIG. 3) accept the acknowledgement 502 as being reliable. In one embodiment, 'appropriate timing' is defined such that the signal must be: (1) high at a particular rising VIDClock 516; (2) low at the next; (3) low at the next; and (4) high at the next. This timing detects many cases where the transmitter and receiver are out of synchronization, or noise in the system looks like (could be mistaken for) an acknowledgement signal. In one embodiment, no single-bit noise corruption would lead to an acknowledgement received where no acknowledgement was intended. This redundant acknowledgement verification is utilized to prevent acknowledgement 502 misidentification.

Figure 6:
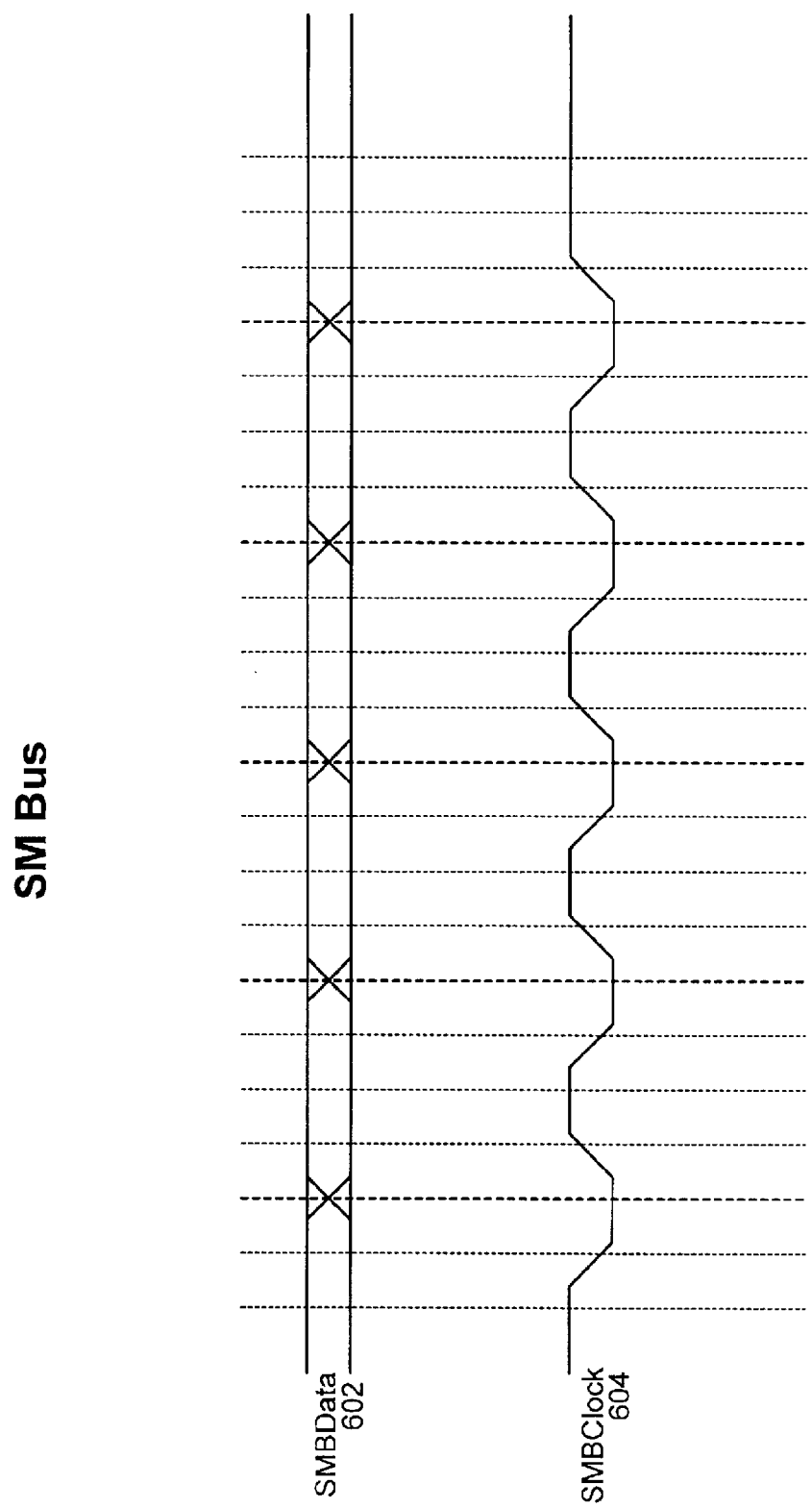
FIG. 6 provides a timing chart illustrative of signal line activity on a generic SM Bus in the art.

Further, in one embodiment, two bits of data are transferred 512 for every clock cycle 514. This is known as "double-pumping". In one embodiment, the data signal 504 from the chip 302 (see FIG. 3) to the VR 306 (see FIG. 3) is 'double-pumped', but the acknowledgement signal 508, traveling in the opposite direction, is not double-pumped. It operates at a one-to-one correlation. By contrast, the SM Bus mentioned above and illustrated in FIG. 6, transfers data 602 on a one-to-one timing correlation with its clock 604. (It does not utilize a guard clock and utilizes an acknowledgement signal multiplexed on SMData 602.)

Further, in one embodiment of the present invention, the microprocessor input and output may use different, incompatible voltages. By contrast, in SM Bus, both SMBClock 604 and SMBData 604 are both inputs and outputs, so it is impossible to support signaling environments where it is most convenient for input and output to have different levels.

Figure 7:
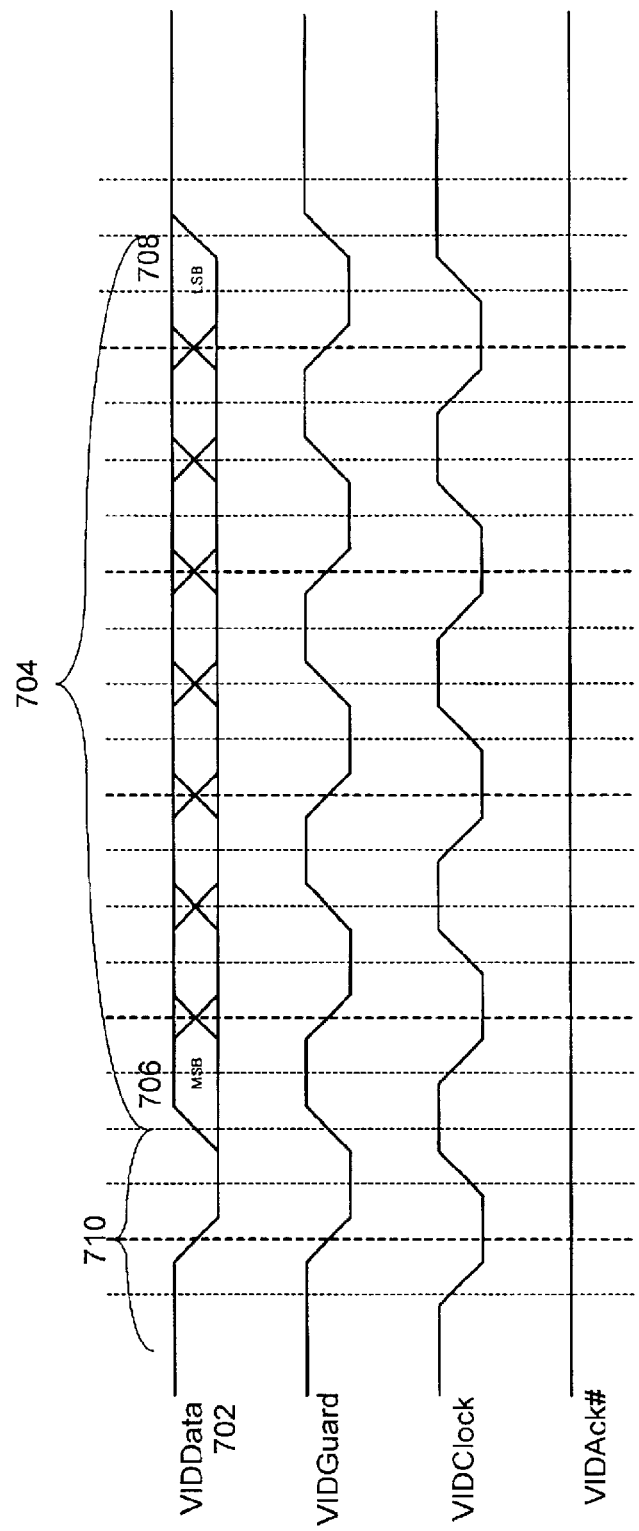
FIG. 7 provides a timing chart illustrative of signal line activity with regard to Command byte transmission under principles of the present invention.

FIG. 7 provides a timing chart illustrative of signal line activity with regard to Command byte transmission under principles of the present invention. In one embodiment of the present invention, the data signal 702 provides a high-low bit sequence (10) 710 to preface the beginning of a Command byte 704. In one embodiment, the eight bits of the command byte 704 begin with the most significant bit (MSB) 706 and end with the least significant bit (LSB) 708.

Figure 8:
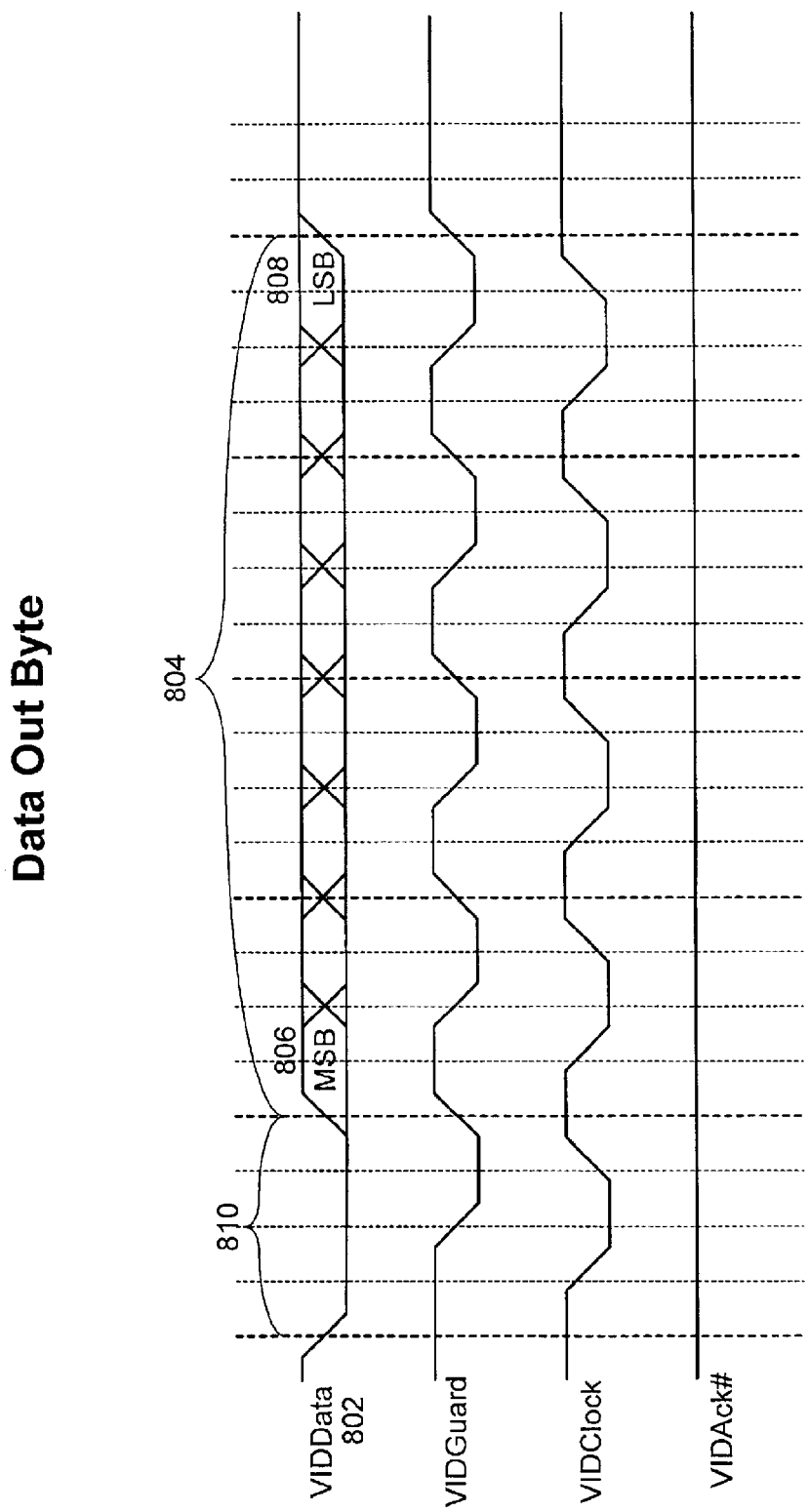
FIG. 8 provides a timing chart illustrative of signal line activity with regard to Data Out byte transmission under principles of the present invention.

FIG. 8 provides a timing chart illustrative of signal line activity with regard to Data Out byte transmission under principles of the present invention. In one embodiment of the present invention, the data signal 802 provides a low-low bit sequence (00) 810 to preface the beginning of a Data Out byte 804. In one embodiment, the eight bits of the command byte 804 begin with the most significant bit (MSB) 806 and end with the least significant bit (LSB) 808.

Figure 9:
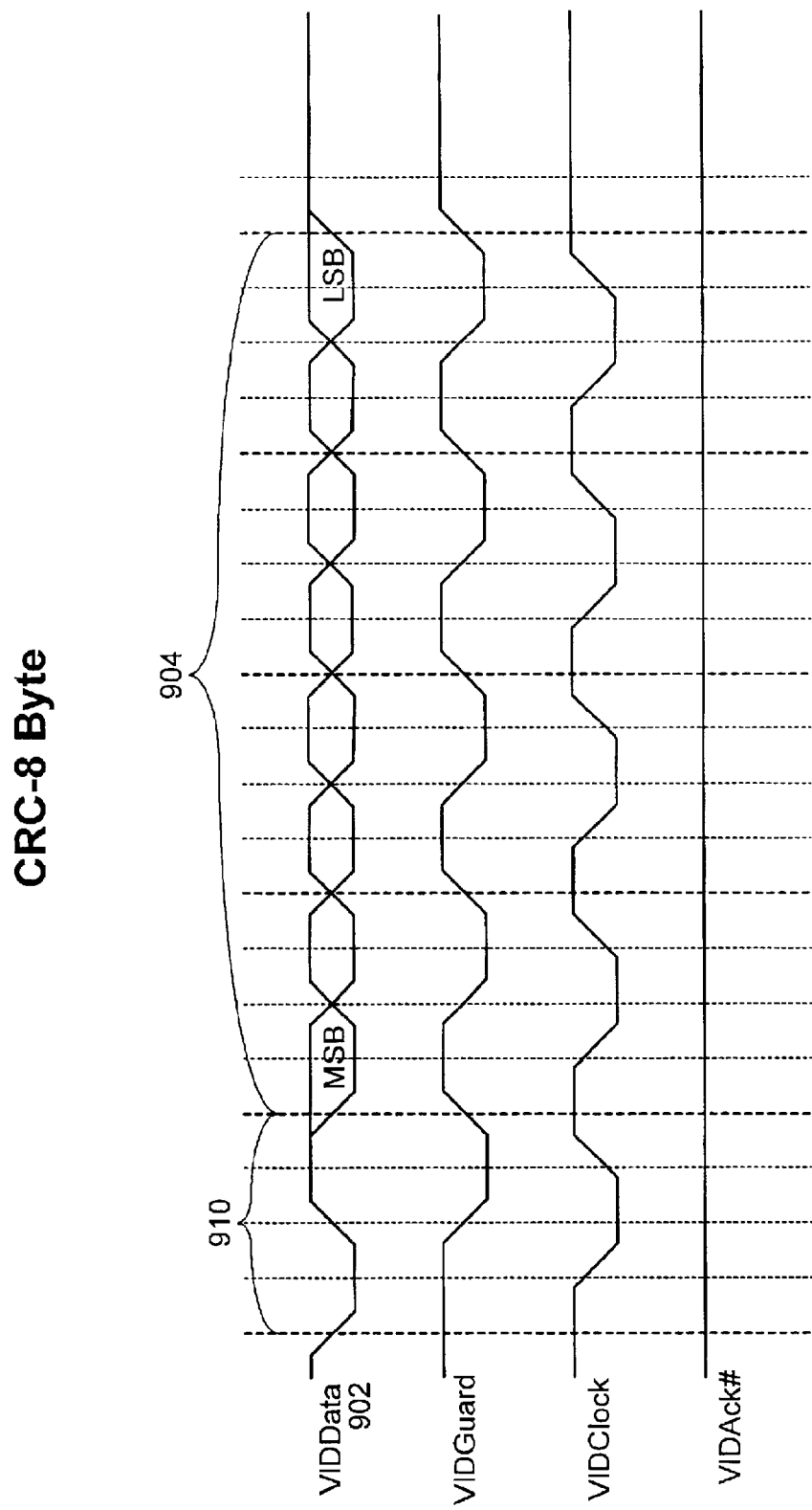
FIG. 9 provides a timing chart illustrative of signal line activity with regard to Cyclic Redundancy Check (CRC)-8 byte transmission under principles of the present invention.

FIG. 9 provides a timing chart illustrative of signal line activity with regard to Cyclic Redundancy Check (CRC)-8 byte transmission under principles of the present invention. In one embodiment of the present invention, the data signal 902 provides a low-high bit sequence (01) 910 to preface the beginning of a CRC-8 byte 904. In one embodiment, CRC-8, which is a form of error correction, is utilized to ensure accurate perception of the information provided by the data signal 902.

Figure 10:
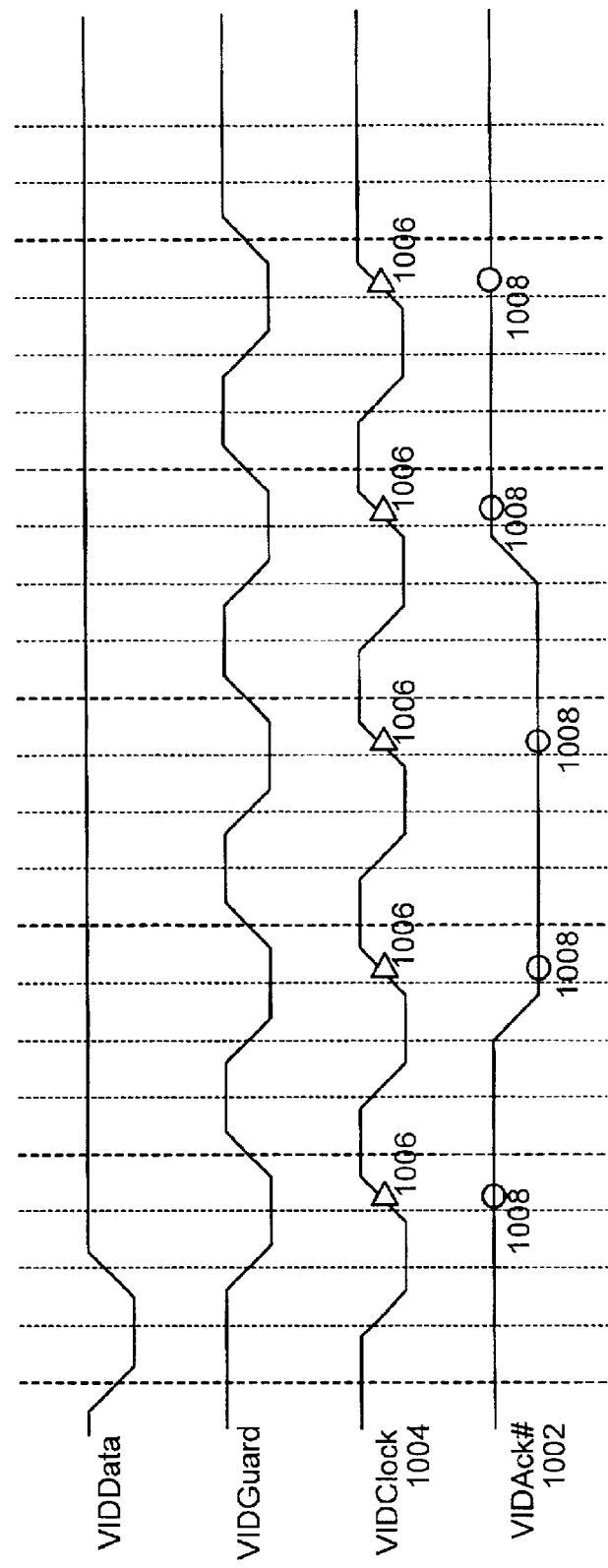
FIG. 10 provides a timing chart illustrative of signal line activity with regard to acknowledgement perception by the microprocessor under principles of the present invention.

FIG. 10 provides a timing chart illustrative of signal line activity with regard to acknowledgement perception by the microprocessor under principles of the present invention. In one embodiment of the present invention as explained in part above, the acknowledgement signal 1002 is sampled at each rising edge of the clock signal. The triangles 1006 in FIG. 10 denote rising edges of the clock signal 1004 used by the VR 306 (see FIG. 3) to potentially enable VIDAck# 1002 to be driven, and the circles 1008 denote each corresponding sample taken by the chip 302 (see FIG. 3) of the acknowledgement signal 1002 in one embodiment.

Figure 11:
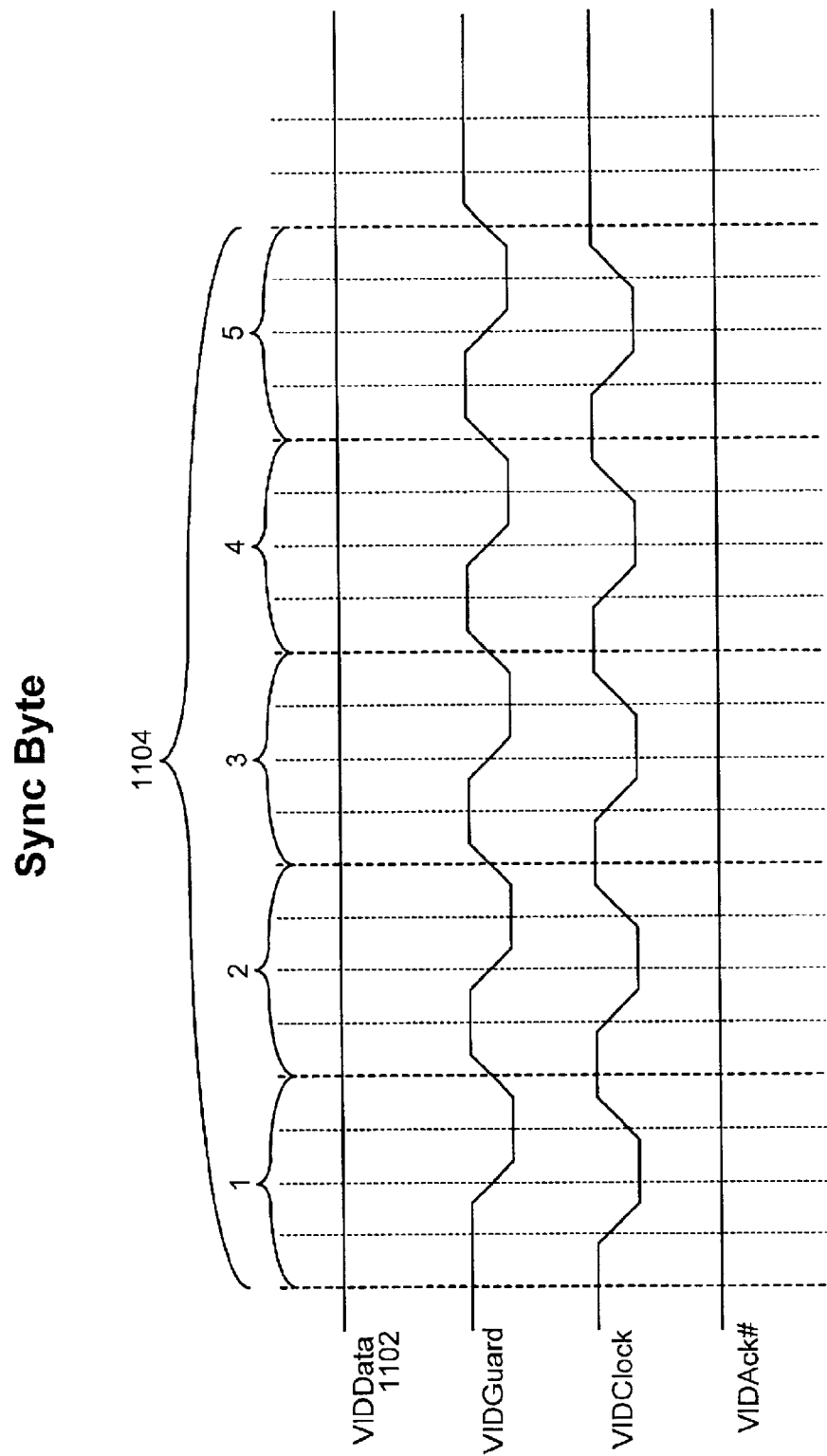
FIG. 11 provides a timing chart illustrative of signal line activity with regard to Synchronization byte transmission under principles of the present invention.

FIG. 11 provides a timing chart illustrative of signal line activity with regard to Synchronization byte transmission under principles of the present invention. In one embodiment, all communication is done a bit at a time over the VIDData 1102 line. In one embodiment, these bits are grouped into higher level structures ('command' byte, etc.). In one embodiment, the synchronization byte is used to establish a common understanding of where the high level structures begin and end. In one embodiment as explained in part above, synchronization 1104 is triggered by five consecutive binary 'highs' in a row of the data signal 1102. In one embodiment, there exists no communication scenario where five binary 'highs' in a row would be utilized, except for synchronization 1104. This prevents the misperception of a synchronization trigger 1104 during a normal communication transmission.

Figure 12:
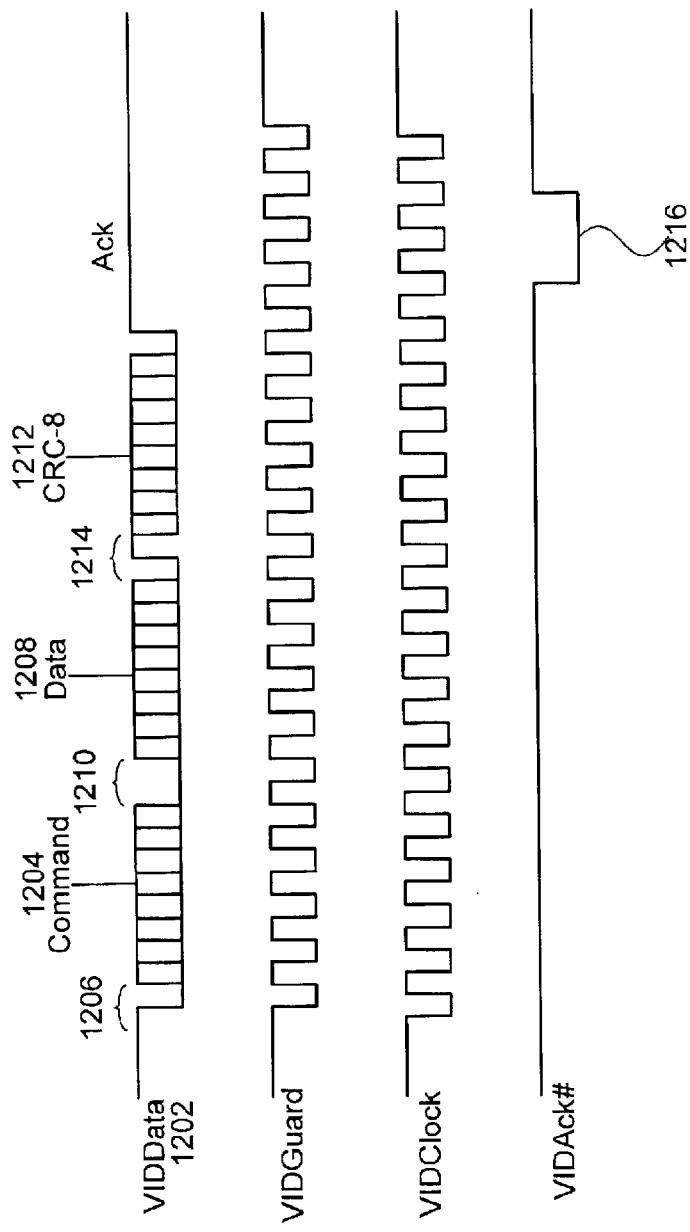
FIG. 12 provides a timing chart illustrative of signal line activity with regard to a typical communication sequence for providing VID to a voltage regulator under principles of the present invention.

FIG. 12 provides a timing chart illustrative of signal line activity with regard to a typical communication sequence for providing VID to a voltage regulator under principles of the present invention. In one embodiment, the data signal 1202 first provides a command byte to the VR 306 (see FIG. 3), which is preceded by a '10' preface. In one embodiment, the data signal 1202 then provides a data byte 1208, which is preceded by a '00' preface 1210. As previously stated, the data byte 1208 incorporates the VID to be transmitted to the VR 306 (see FIG. 3). In one embodiment, the data signal 1202 then provides a CRC-8 byte 1212, which is preceded by a '01' preface 1214. Following the CRC-8 byte 1212 and the request for acknowledgement in one embodiment, an acknowledgement 1216 is returned from the VR 306 (See FIG. 3).

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A system to communicate between a device and a controller, the system comprising:

a data line to communicate a data signal of a specific frequency from said device to said controller;

a clock line to communicate a clock signal of a specific frequency from said device to said controller; an acknowledgement line to communicate an acknowledgement signal of specific frequency from said controller to said device to verify receipt of said data signal; and a guard line to communicate a guard signal from said device to said controller; wherein the data signal comprises at least device information to be utilized by the controller;

the clock signal provides a timing reference, for transmission by the device and receipt by the controller, of the data signal;

said timing reference is verified through analysis of the guard signal in relation to the clock signal; and data signal synchronization occurs through recognition of a bit pattern in the data signal.

2. The system of claim 1, and wherein the acknowledgement signal frequency is equal to the clock signal frequency and the data signal frequency is twice the clock signal frequency.

3. The system of claim 1, wherein the device recognizes the receipt of the acknowledgement signal after sensing two consecutive binary transitions.

4. The system of claim 3, wherein the initial binary transition is 'high' to 'low' and the subsequent binary transition is 'low' to 'high'.

5. The system of claim 1, wherein the data signal synchronization occurs upon recognition of data signal maintenance at binary 'high' for five consecutive cycles of the clock signal.

6. The system of claim 1, wherein the guard signal operates at a specific phase and utilizes substantially the same waveform and period as the clock signal.

7. The system of claim 6, wherein the timing reference is verified by assuring that the guard signal is at an appropriate binary value given a specific activity of the clock signal.

8. The system of claim 7, wherein the timing reference is verified by assuring that when a transition of the clock signal from 'high' to 'low' is perceived, the guard signal is at a binary 'high', and when a transition of the clock signal from 'low' to 'high' is perceived, the guard signal is at a binary 'low'.

9. The system of claim 8, wherein timing reference is verified by assuring that the transition of the clock signal from 'low' to 'high' is recognized only when the previous transition of the clock signal from 'high' to 'low' had a guard signal at a binary 'high'.

10. The system of claim 1, wherein the device information comprises a voltage identifier (VID), expressing the device's voltage requirement.

11. The system of claim 10, wherein the device voltage requirement is referenced by the controller to provide the device with an appropriate voltage supply.

12. The system of claim 11, wherein the device is a microprocessor and the controller is a voltage regulator.

13. The system of claim 11, further comprising a disable line to communicate a disable signal to the controller, wherein said disable signal is utilized to override normal operation of the controller and prevent communication between said device and controller.

14. A method to communicate between a device and a controller, comprising:

communicating, via a data line, a data signal of a specific frequency from said device to said controller;

communicating, via a clock line, a clock signal of a specific frequency from said device to said controller;

communicating, via a guard line, a guard signal from said device to said controller;

communicating, via an acknowledgement line, an acknowledgement signal of specific frequency from said controller to said device to verify receipt of said data signal;

providing, within the data signal, at least device information to be utilized by the controller;

providing, by the clock signal, a timing reference, for transmission by the device and receipt by the controller, of the data signal;

verifying said timing reference through analysis of the guard signal in relation to the clock signal; and synchronizing the data signal through recognition of a bit pattern in the data signal.

15. The method of claim 14, wherein the acknowledgement signal frequency is equal to the clock signal frequency and the data signal frequency is twice the clock signal frequency.

16. The method of claim 14, wherein the device recognizes the receipt of the acknowledgement signal after sensing two consecutive binary transitions.

17. The method of claim 16, wherein the initial binary transition is 'high' to 'low' and the subsequent binary transition is 'low' to 'high'.

18. The method of claim 14, wherein the data signal synchronization occurs upon recognition of data signal maintenance at binary 'high' for five consecutive cycles of the clock signal.

19. The method of claim 14, wherein the guard signal operates at a specific phase and utilizes substantially the same waveform and period as the clock signal.

20. The system of claim 19, wherein the timing reference is verified by assuring that the guard signal is at an appropriate binary value given a specific activity of the clock signal.

21. The system of claim 20, wherein the timing reference is verified by assuring that when a transition of the clock signal from 'high' to 'low' is perceived, the guard signal is at a binary 'high', and when a transition of the clock signal from 'low' to 'high' is perceived, the guard signal is at a binary 'low'.

22. The method of claim 21, wherein timing reference is verified by assuring that the transition of the clock signal from 'low' to 'high' is recognized only when the previous transition of the clock signal from 'high' to 'low' had a guard signal at a binary 'high'.

23. The method of claim 14, wherein the device information comprises a voltage identifier (VID), expressing the device's voltage requirement.

24. The method of claim 23, wherein the device voltage requirement is referenced by the controller to provide the device with an appropriate voltage supply.

25. The method of claim 24, wherein the device is a microprocessor and the controller is a voltage regulator.

26. The method of claim 24, further comprising a disable line to communicate a disable signal to the controller, wherein said disable signal is utilized to override normal operation of the controller and prevent communication between said device and controller.

27. A set of instructions residing in a storage medium, said set of instructions capable of being executed by a processor to communicate between a device and a controller, comprising:

communicating, via a data line, a data signal of a specific frequency from said device to said controller;

communicating, via a clock line, a clock signal of a specific frequency from said device to said controller;

communicating, via a guard line, a guard signal from said device to said controller;

communicating, via an acknowledgement line, an acknowledgement signal of a specific frequency from said controller to said device to verify receipt of said data signal;

providing, within the data signal, at least device information to be utilized by the controller;

providing, by the clock signal, a timing reference, for transmission by the device and receipt by the controller, of the data signal;

verifying said timing reference through analysis of the guard signal in relation to the clock signal; and synchronizing the data signal through recognition of a bit pattern in the data signal.

28. The set of instructions of claim 27, wherein the acknowledgement signal frequency is equal to the clock signal frequency and the data signal frequency is twice the clock signal frequency; and wherein the data signal synchronization occurs upon recognition of data signal maintenance at binary 'high' for five consecutive cycles of the clock signal.

29. The set of instructions of claim 27, wherein the device recognizes the receipt of the acknowledgement signal after sensing an initial binary transition from 'high' to 'low' and a subsequent binary transition from 'low' to 'high'; and wherein the timing reference is verified by assuring that, upon sampling, the guard signal is a binary 'low' when the clock signal is a binary 'high' and that the guard signal is a binary 'high' when the clock signal is a binary 'low'.

30. The set of instructions of claim 27, wherein the device information comprises a device voltage requirement to be referenced by the controller for provision of an appropriate voltage supply to the device and wherein the device is a microprocessor and the controller is a voltage regulator.

* * * * *